United States Patent
Hinton et al.

(10) Patent No.: US 6,821,671 B2
(45) Date of Patent: Nov. 23, 2004

(54) METHOD AND APPARATUS FOR COOLING AND POSITIONING PRISMATIC BATTERY CELLS

(75) Inventors: Michael L. Hinton, Highlands Ranch, CO (US); Daniel D. Rivers, Monument, CO (US)

(73) Assignee: LG Chem, Ltd. (KR)

( * ) Notice: Subject to any disclaimer, the term of this patent is extended or adjusted under 35 U.S.C. 154(b) by 328 days.

(21) Appl. No.: 10/087,173

(22) Filed: Mar. 1, 2002

(65) Prior Publication Data

US 2003/0165734 A1 Sep. 4, 2003

(51) Int. Cl.[7] .......................... H01M 2/02; H01M 2/20; H01M 2/00
(52) U.S. Cl. ....................................... 429/120
(58) Field of Search ........................................ 429/120

(56) References Cited

U.S. PATENT DOCUMENTS

| | | | | |
|---|---|---|---|---|
| 5,354,630 A | * | 10/1994 | Earl et al. ................... | 429/101 |
| 5,382,480 A | * | 1/1995 | Molyneux ................... | 429/120 |
| 5,385,793 A | * | 1/1995 | Tiedemann et al. ........... | 429/62 |
| 6,099,986 A | * | 8/2000 | Gauthier et al. ............. | 429/120 |
| 6,117,584 A | * | 9/2000 | Hoffman et al. ............. | 429/120 |

FOREIGN PATENT DOCUMENTS

| | | | | |
|---|---|---|---|---|
| EP | 736226 | * | 3/1999 | ............ H01M/8/04 |
| EP | 673553 | * | 2/2001 | .......... H01M/10/50 |
| JP | 08-222280 | * | 8/1996 | .......... H01M/10/50 |

* cited by examiner

*Primary Examiner*—Mark Ruthkosky
(74) *Attorney, Agent, or Firm*—Cantor Colburn LLP

(57) ABSTRACT

The present invention relates to an implementation for cooling and positioning prismatic battery cells. In one embodiment of the present invention, a cooling fin made of thermally conductive material is placed between prismatic battery cells. The cooling fin also acts as a structural component for the battery. The area of the cooling fin in contact with the cell us used to transfer the cell's heat to a second area of the cooling fin that is not in contact with the cell. The second area is in direct in a fluid stream (air, water, oil, etc.) that conducts the heat away. In one embodiment, the cooling fin is constrained with other fins where an alternating (cell, cooling fin, cell) geometry is obtained. Then components are combined into a compressed unit. The present invention results in a lighter and efficient structure than existing methods that solely rely on water or air circulation.

30 Claims, 4 Drawing Sheets

METHOD AND APPARATUS FOR COOLING AND POSITIONING PRISMATIC BATTERY CELLS

BACKGROUND OF THE INVENTION

1. Field of the Invention

The present invention relates to an implementation for cooling and positioning prismatic battery cells.

2. Background Art

Batteries are used in a wide variety of electronic, electrical and mechanical devices. During charging and discharging, chemical reactions in batteries often cause the internal temperature to rise. The resulting higher temperature degrades battery performance and in extreme cases causes damage. This common battery overheating problem is also found in new battery applications such as Hybrid Electric Vehicles (HEV) and Electric Vehicles (EV). One type of battery used in EV and HEV is a Lithium-ion Polymer Battery (LiPB) cell. The LiPB cell is a new type of prismatic cell that can generate a high power output with a small battery size. Until recently, the use of LiPB has been largely confined to small portable electronic devices such as cellular phones. However, advances in technology has made new high-power LiPB an ideal candidate of EV and HEV applications. The new applications bring with them concerns of overheating because the higher power output generates more heat than previous applications in electronic devices. With its potentially high temperature application in EV and HEV, proper cooling and ventilation procedures must be implemented to address overheating.

In many common battery cooling implementations, air, water or some other liquid coolant is used as the cooling agent. Often air or a liquid coolant (e.g. water) is pumped around and between battery cells for cooling. Both air-based and liquid-based implementations have their drawbacks. With air cooling, the structural demand on the battery cells is high, especially in a battery module where cells are kept in compression. Air channels must be constructed around the battery cells to allow air to bring heat out of the system. The high spatial demand can limit the range of battery applications.

Liquid-based cooling is more effective than air cooling. For the same volume unit, liquid such as water can carry away more heat than air. Although the cooling fluid uses less volume, it weighs substantially more than air. The cooling fluid, along with re-circulation and plumbing fittings, adds significant weight to the overall battery module. The added weight often can be upward to 20% of the battery net weight. With the extra weight, the power output of the battery drops as power-to-weight ratio decreases.

An issue related to cooling is the positioning of battery cells. Often the cooling system also has to hold the battery cells in place. There are implementations which use plastic forming to contain battery cells. When plastic forming containers are used, there is a large weight gain and loss of cooling efficiency. This is because plastic, especially plastic thick enough to act as a structural member, is a very good insulator. For physically restraining cells in place, some implementations use the packaging to make up a module around the cells (e.g. for nickel-metal hydride NiMH batteries). The packaging is plastic and fastened to a structure that forms a battery pack.

Cooling Polymer Cells

Many of the aforementioned problems in battery cooling also exist in LiPB cells. First if a liquid-based implementation is used, the extra weight will add to the overall weight to the battery. This is a problem in HEV and EV where vehicle weight is to be minimized. However, if an air-based cooling implementation is used, a large amount of volume is needed to achieve adequate cooling efficiency. This negates a major advantage of LiPB cell—the high power-to-size ratio. Another problem that arises is the use of polymer in LiPB cells. Since a polymer is a plastic-like material, it acts an insulator and degrades cooling performance. The challenge, therefore, is to find a cooling implementation that is effective in dissipating heat, is compact, light in weight, and holds the battery cells in place. Such an implementation would also need to have low structural demand to minimize extra insulation.

SUMMARY OF THE INVENTION

The present invention relates to an implementation for cooling and positioning prismatic battery cells.

In one embodiment of the present invention, a thin cooling fin made of thermally conductive material is placed between prismatic battery cells. The cooling fin also acts as a structural constraint to hold the adjacent battery cell in place. Each cooling fin is larger than the cell itself and the area of the cooling fin in contact with the cell transfers heat to an area of the cooling fin that is not in contact with the cell. The area not in contact with the cell is corrugated to maximize surface area for heat dissipation. The corrugated area is direct contact with in a fluid stream (water, oil, etc.) or air so that heat is carried away by either conduction or convection. In another embodiment of the present invention, the cooling fins are constrained with other similar fins where an alternating (cell, cooling fin, cell, cooling fin, cell, etc.) geometry is obtained. Then all the fins are drawn together making a stronger single unit, keeping the cells in compression.

The present invention results in a much lighter and efficient structure than existing methods that solely rely on water or air circulation. The use of cooling fins to transfer heat from cells negates the need for air or water channels around each cell. This minimizes the volume of the overall battery module. Also the function of the cooling fins as structural constraint for the cells overcomes the problem of added insulation caused by extra plastic structural material used in existing implementations.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Embodiments of the present invention relate to an implementation for cooling and positioning prismatic battery cells.

The present invention is designed to address the problems found in many battery cooling applications for prismatic cells. In particular it aims to provide an implementation that is efficient, light weight and low in volume demand. In one embodiment of the present invention, a thin cooling fin made of thermally conductive material is placed between prismatic battery cells. The cooling fin also serves as a structural constraint to hold the adjacent battery cell in place, reducing the need for extra structural material. In one embodiment, the cooling fins are placed between individual cells. In another embodiment, the cooling fins are placed among every third cell. The fins are notched to provide structural support for holding of the cells in place. Each cooling fin is larger than the cell itself and the area of the cooling fin in contact with the cell is used to transfer heat to an area that is not in contact with the cell. The area not in contact with the cell is corrugated to maximize surface area for heat dissipation. In one embodiment of the present invention, the corrugated area is direct in a fluid stream (air, water, oil, etc.) that conducts the heat away from the cell. In another embodiment of the present invention, forced circulation (fans, pumps) or natural convection can be used to carry the heat away.

Figure 1:
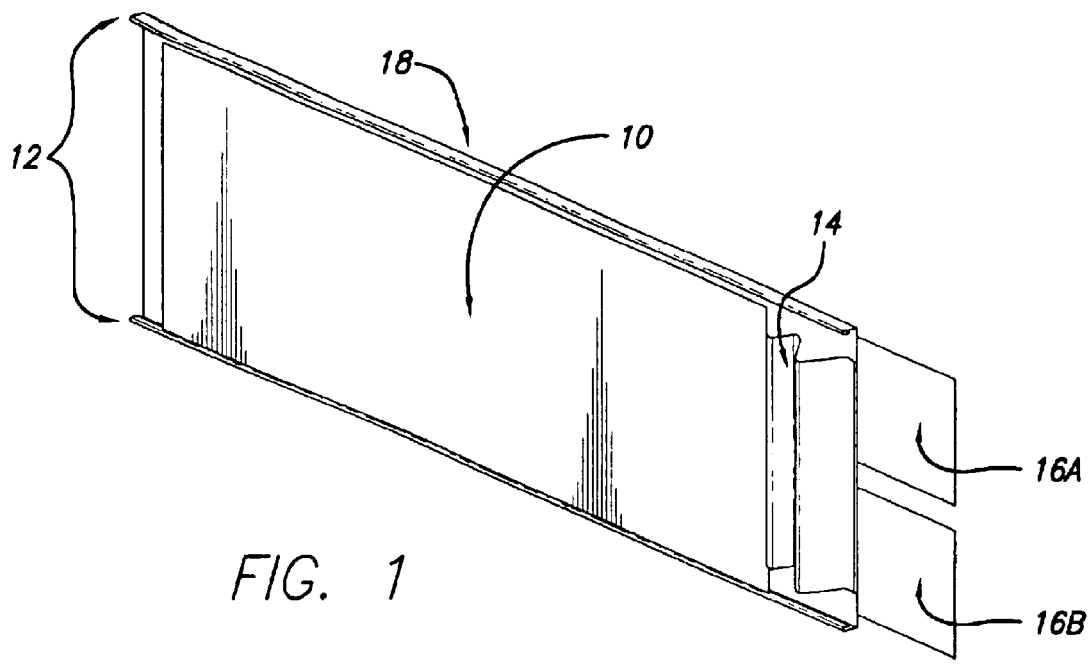
FIG. 1 shows the major components of a prismatic battery cell according to an embodiment of the present invention.

FIG. 1 shows an embodiment of the present invention. Cooling fin 10 is placed on top of prismatic battery cell 18. From this view, most of prismatic battery cell 18 is hidden underneath cooling fin 10 and is in direct contact with it throughout the entire length of cooling fin 10. In one embodiment, prismatic battery cell 18 is an LiPB (Lithium-ion Polymer Battery) cell. In another embodiment, prismatic battery cell 18 is kept in compression. Since the active material is kept in a compressed pouch, there is good contact between active material inside the cell and cooling fin 10. This improves the thermal pathway and provides a low thermal impedance.

The main "body" of prismatic battery cell 18, which is the area bounded by pair of railings 12, holds cooling fin 10 in place. One end of cooling fin 10 consists of corrugated area 14. The function of corrugated area 14 is to provide maximum surface area to dissipate heat. Corrugated area 14 is not in contact with prismatic battery cell 18. Heat is first transferred from prismatic battery cell 18 to the flat area of cooling fin 10, then to corrugated area 14. Once heat reaches corrugated area 14 it is dissipated through direct contact with air, water or any other coolant. Forced circulation (fans, pumps) or natural convection can be used to carry the heat away.

On one end of prismatic battery cell 18 are tabs 16A and 16B. One tab makes direct contact to the anode inside the prismatic battery cell and the other tab makes direct contact to the cathode. The tabs serve two functions. First the tabs reach into the active material and serve as electrodes. Thus they are access points (terminals) for charge and discharge. Second they transfer heat from the interior of prismatic cell 18 to themselves where forced circulation or natural convection can be used to carry the heat away.

Figure 2:
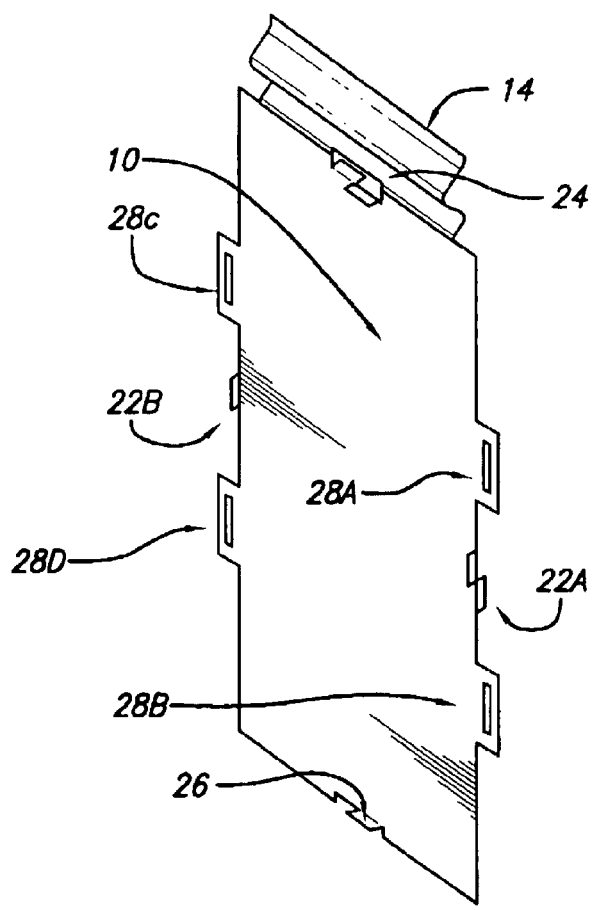
FIG. 2 shows the cooling fin of a prismatic battery cell according to an embodiment of the present invention.
Figure 3:
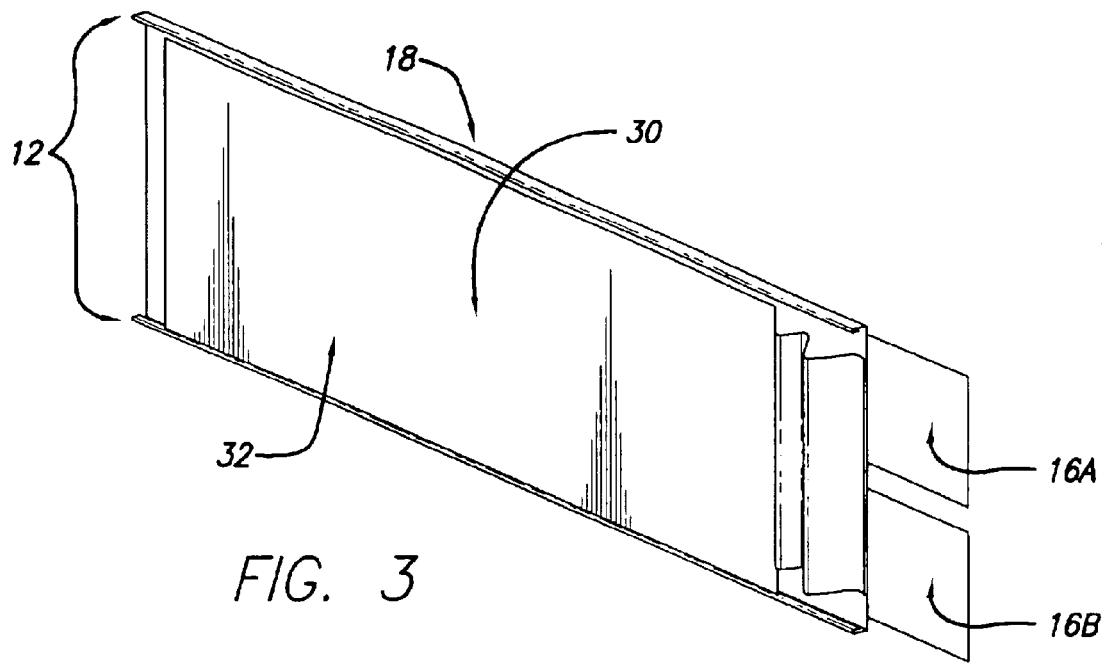
FIG. 3 shows the prismatic battery cell according to an embodiment of the present invention.
Figure 7:
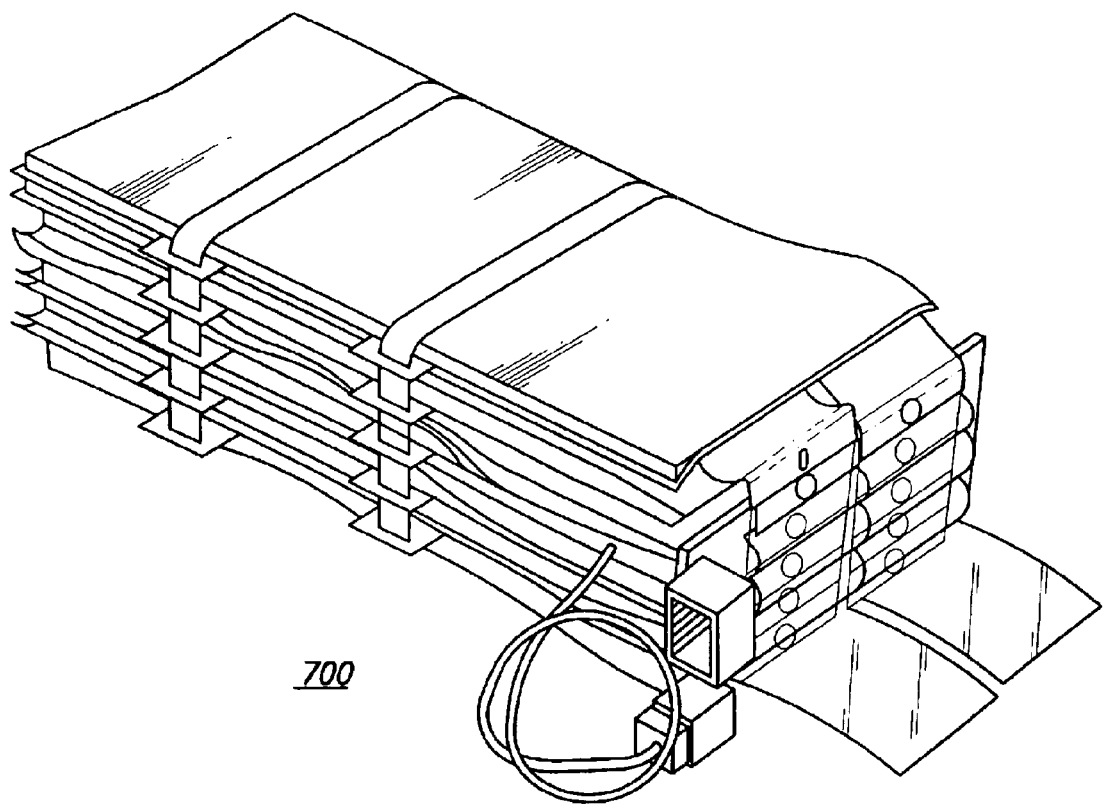
FIG. 7 depicts a battery module drawn together with multiple cooling fins and cells.

To aid understanding of the overall construction of the present invention, FIG. 2 and FIG. 3 are provided to show the individual components of an embodiment. FIG. 2 shows an isometric side view of cooling fin 10 apart from the battery cell. Cooling fin 10 is shown in a vertical orientation. In one embodiment of the present invention cooling fin 10 is made out of aluminum. In another embodiment of the present invention cooling fin 10 is made out of copper. In one or more embodiments, cooling fin 10 is thin (several mm in thickness) and is in direct contact with prismatic battery cell 18. Bent tabs 22A and 22B are located along the vertical edges as shown. An additional bent tab 24 is located at the junction between the flat area of cooling fin 10 and corrugated area 14. A final bent tab 26 is located at the bottom of the fin. These bent tabs are used to secure cooling fin 10 to the battery cell. Slots 28A, 28B, 28C and 28D provide places for straps to run through so multiple battery cells can be drawn together. FIG. 7 shows battery module 700 where straps are inserted through slots on the cooling fins to draw multiple battery cells and fins together to form module 700. The straps keep the battery module in compression.

FIG. 3 shows prismatic battery cell 18 apart from the cooling fin. The cell is shown in a horizontal orientation, the same orientation as FIG. 1. In the center of prismatic battery cell 18 is pouch 30, which contains the chemical material, anode and cathode of the battery. Pouch 30 is sealed and doubly-folded with itself at area 32. In one embodiment, it is kept in compression to minimize volume and maximize contact between electrodes and active materials. The compression also minimizes the length of the thermal pathway between the active material and the cooling fin. Railings 12 and tabs 16A and 16B are the same as from FIG. 1. Along with the cooling fin shown in FIG. 2, the entire battery cell is encapsulated and held in place. The two separate pieces shown in FIG. 2 and FIG. 3 are fitted to match in size. The assembly is completed by sliding the cooling fin between railings 12 and fitting the fin onto the area of the cell bounded by railings 12.

Figure 4:
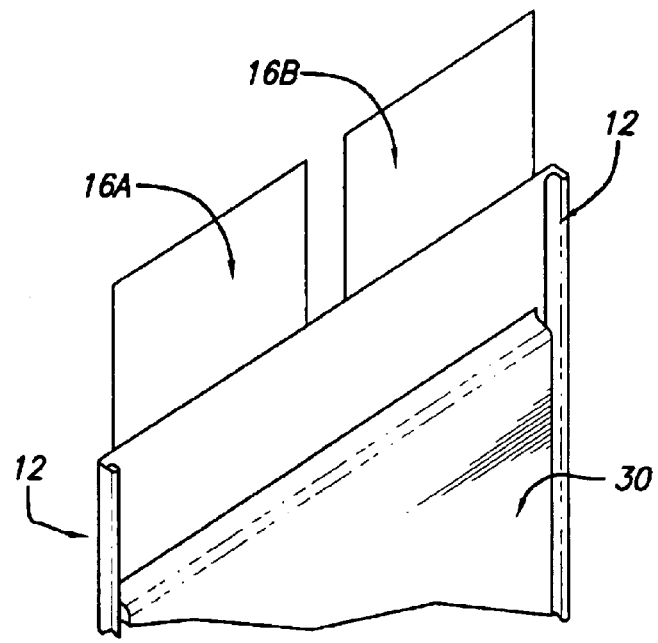
FIG. 4 is a detailed view of the tabbed-end of the prismatic battery cell.
Figure 5:
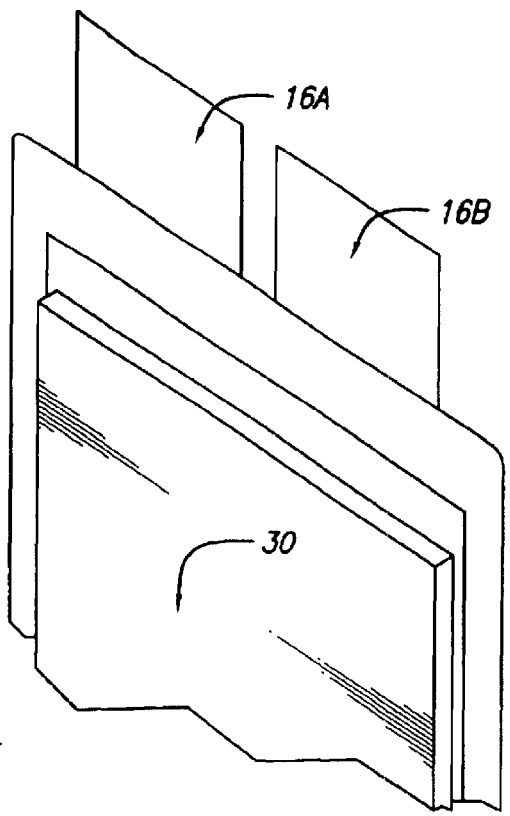
FIG. 5 is another detailed view of the tabbed-end of the prismatic battery cell.

FIG. 4 depicts a detailed view of the tabbed end of prismatic battery cell 18. The prismatic battery is in a vertical orientation in this figure. As shown, railings 12 provide hollow spaces for cooling fin 10 to slide into place. Pouch 30 and tabs 16A and 16B are the same as from previous figures. FIG. 5 shows another detailed view of the tabbed end of prismatic battery cell 18 apart from the railings 12. Pouch 30 and tabs 16A and 16B are the same as from previous figures.

Figure 6:
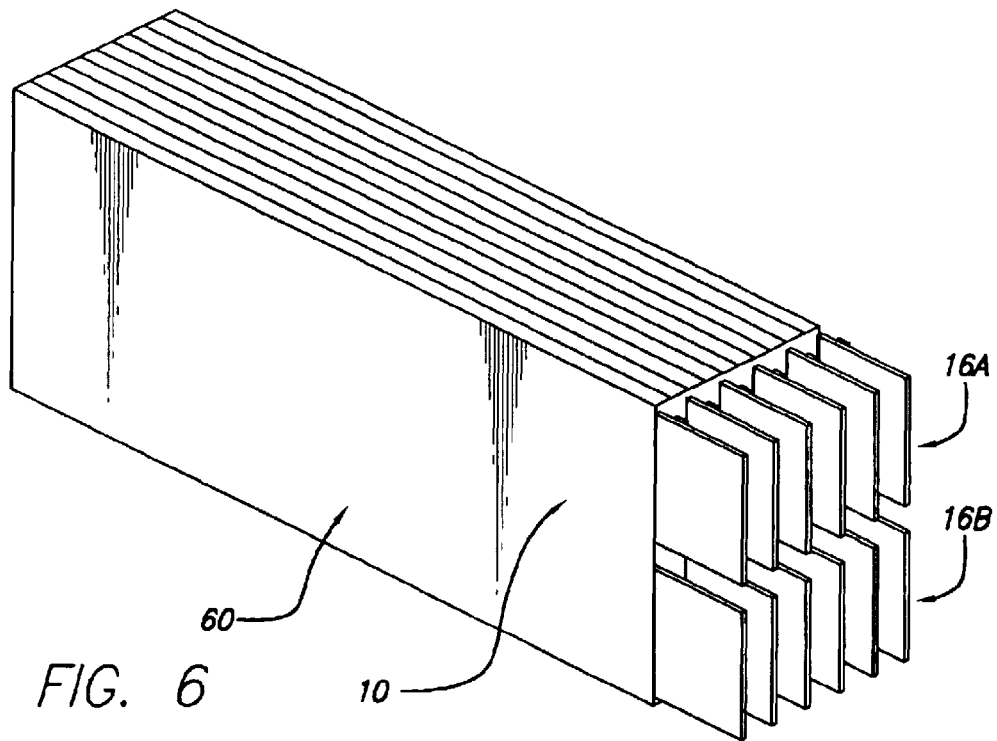
FIG. 6 shows a battery module with cooling fins embedded with multiple prismatic battery cells according to an embodiment of the present invention.

One embodiment of the present invention has the individual cooling fins and cells drawn together to form a battery module. FIG. 6. shows a battery module according to an embodiment of the present invention. Battery module 60 is composed of numerous prismatic battery cells. In one embodiment, the arrangement within the module is an alternating geometry (cell, cooling fin, cell, cooling fin, cell, etc.). In another embodiment, the cooling fins are inserted next to every third cell. The ratio of cell to cooling fin can vary. In one or more embodiments, all the components are drawn together making a stronger single battery module, keeping the cells in compression. In FIG. 6, cooling fins 10 are highlighted in the pictures by a darker color. Although not visible from the figure, each cell has a cooling fin and the corrugated area of the fin is near tabs 16A and 16B of each cell. Air or other liquid coolant flows around the area of tabs 16A and 16B and the corrugated areas of cooling fins 10 to draw heat away. There is no need for air or coolant to flow into the interior of the module as both the cooling fins and the tabs draw interior heat to the edge of the module.

The heat rejection scheme in the present invention results in a much lighter and efficient structure than existing implementations. The cooling fin is effective in transferring heat so that usually even air, the less-effective coolant, is adequate. In one embodiment the cooling fins only account for less than 8% of the battery total weight, compared to a 15–20% ratio in common prior art implementations. The use of the cooling fins as structural constraint for the cells overcomes the problem of unintended insulation caused by extra plastic material used in existing implementations. Also the design of the invention allows heat to be drawn away from the cells without using air or water channels between individual cells. The tight integration between cells and cooling fins drastically minimizes volume and makes compression of whole battery modules possible. This allows the LiPB cell to retain its advantage of having a high power-to-size ratio.

Thus, a prismatic battery cooling and positioning implementation is described in conjunction with one or more specific embodiments. The invention is defined by the claims and their full scope of equivalents.

What is claimed is:

1. An apparatus for cooling and positioning prismatic battery cells, comprising:
   a primastic battery cell with active material in a sealed pouch;
   a cooling fin made of thermally conductive material with bent tabs;
   a pair of terminal tabs that reach into said pouch to draw heat away from said cell; and
   railings along length of said cell whereby said cooling fin is attached to an area of said cell bounded by said railings by said bent tabs.

2. The apparatus of claim 1 wherein said cooling fin further comprises
   a flat area in direct contact with said cell; and
   a corrugated area not in direct contact with said cell but in direct contact with a coolant agent wherein heat moves from said cell to said flat area to said corrugated area to said cooling agent.

3. The apparatus of claim 2 wherein said cooling fin is made out of copper.

4. The apparatus of claim 2 wherein said cooling fin is made out of aluminum.

5. The apparatus of claim 2 wherein said cooling agent is air.

6. The apparatus of claim 5 wherein said air is pumped.

7. The apparatus of claim 5 wherein said air is naturally flowing.

8. The apparatus of claim 2 wherein said cooling agent is liquid.

9. The apparatus of claim 2 wherein one or more of said cooling fins are combined with one or more of said cells in an alternating geometry of fin-cell-fin-cell to form a battery module.

10. The apparatus of claim 9 wherein said cooling fins are inserted among any multiple number of cells.

11. The apparatus of claim 2 wherein said cell is an Lithium-ion Polymer Battery (LiPB) cell.

12. The apparatus of claim 2 wherein said cell is kept in compression.

13. The apparatus of claim 2 wherein said cell is held in place by said cooling fin.

14. A method for cooling and positioning prismatic battery cells, comprising:
    sealing active material of a primastic battery cell in a pouch;
    attaching a cooling fin made of thermally conductive material to said cell; and
    attaching a pair of terminal tabs that reach into said pouch to draw heat away from said cell, wherein said attaching a cooling fin further comprises:
    folding railings along length of said cell;
    creating bent tabs in said cooling fin to attach said cooling fin to an area of said cell bounded by said railings; and
    sliding said cooling fin between said railings to fit around said area.

15. The method of claim 14 wherein said cooling fin further comprises:
    a flat area in direct contact with said cell; and
    a corrugated area not in direct contact with said cell but in direct contact with a coolant agent whereby heat moves from said cell to said flat area to said corrugated area to said cooling agent.

16. The method of claim 15 wherein said cooling fin is made out of copper.

17. The method of claim 15 wherein said cooling fin is made out of aluminum.

18. The method of claim 15 wherein said cooling agent is air.

19. The method of claim 18 wherein said air is pumped.

20. The method of claim 18 wherein said air is naturally flowing.

21. The method of claim 15 wherein said cooling agent is liquid.

22. The method of claim 15 wherein one or more of said cooling fins are combined with one or more of said cells in an alternating geometry of fin-cell-fin-cell to form a battery module.

23. The method of claim 22 wherein said cooling fins are inserted among any multiple number of cells.

24. The method of claim 15 wherein said cell is an Lithium-ion Polymer Battery (LiPB) cell.

25. The method of claim 15 wherein said cell is kept in compression.

26. The method of claim 15 wherein said cell is held in place by said cooling fin.

27. An apparatus for cooling and positioning prismatic battery cells, comprising:
    a prismatic battery cell with active material in a sealed pouch with a flat surface area;
    a cooling fin made of thermally conductive material comprising:
    a flat area in direct contact with said cell, wherein said flat area covers said flat surface area of said cell; and
    a corrugated area, extending from said flat area, wherein said corrugated area is not in direct contact with said cell but in direct contact with a coolant agent.

28. The apparatus of claim 27 further comprising:
    a pair of terminal tabs that reach into said pouch to draw heat away from said cell.

29. A method for positioning and cooling prismatic battery cells, comprising:
    attaching a cooling fin, made of thermally conductive material, comprising of a flat area and a corrugated area, to a prismatic battery cell with active material sealed in a pouch with a flat surface area, wherein said attaching comprises:
    attaching said flat area of said cooling fin to said flat surface area of said cell, whereby said flat area of cooling fin comes in direct contact with said cell; and
    positioning said corrugated area not in direct contact with said cell but in direct contact with a cooling agent.

30. The method of claim 29 wherein said cooling fin further comprises:
    attaching a pair of terminal tabs that reach into said pouch to draw heat away from said cell.

* * * * *